(12) United States Patent
McLain et al.

(10) Patent No.: US 7,805,984 B2
(45) Date of Patent: Oct. 5, 2010

(54) INTAKE MANIFOLD TUNING VALVE FUZZY LOGIC DIAGNOSTIC

(75) Inventors: Kurt D. McLain, Clarkston, MI (US); Wenbo Wang, Novi, MI (US)

(73) Assignee: GM Global Technology Operations, Inc.

( * ) Notice: Subject to any disclaimer, the term of this patent is extended or adjusted under 35 U.S.C. 154(b) by 1077 days.

(21) Appl. No.: 11/467,032

(22) Filed: Aug. 24, 2006

(65) Prior Publication Data

US 2008/0052042 A1  Feb. 28, 2008

(51) Int. Cl.
*G01M 15/04* (2006.01)
(52) U.S. Cl. .................. 73/114.31; 73/114.37
(58) Field of Classification Search ............. 73/114.31, 73/114.32, 114.33, 114.36, 114.37
See application file for complete search history.

(56) References Cited

U.S. PATENT DOCUMENTS

| 7,270,116 B2 * | 9/2007 | Pauli et al. .................. 123/480 |
| 2005/0161013 A1 * | 7/2005 | Marriott ................. 123/184.53 |
| 2007/0221148 A1 * | 9/2007 | Marriott .................. 123/90.15 |
| 2007/0244626 A1 * | 10/2007 | Lain et al. ................... 701/114 |

* cited by examiner

*Primary Examiner*—Eric S. McCall

(57) ABSTRACT

A method of diagnosing a malfunction of a tuning valve of an intake manifold coupled to an internal combustion engine is provided. The method includes: commanding the tuning valve to at least one of a closed and an opened position; computing an average deviation of manifold absolute pressure; determining an average deviation threshold using fuzzy logic based on engine speed and airflow per cylinder; comparing the average deviation to the average deviation threshold; and diagnosing a malfunction of the tuning valve based on a comparison of the average deviation and the average deviation threshold.

18 Claims, 3 Drawing Sheets

INTAKE MANIFOLD TUNING VALVE FUZZY LOGIC DIAGNOSTIC

FIELD OF THE INVENTION

The present disclosure relates to internal combustion engines, and more particularly to managing airflow in an intake manifold of an internal combustion engine.

BACKGROUND OF THE INVENTION

The statements in this section merely provide background information related to the present disclosure and may not constitute prior art.

Engine systems include an engine having an air intake manifold. Air flows into the intake manifold through an inlet. An air filter removes dirt or debris from the inlet air. A throttle valve regulates the air flow into the intake manifold. A controller determines an appropriate air/fuel (A/F) ratio for engine operation based on the air flow and other engine parameters.

Internal combustion engines having one or more cylinders may be provided with at least one pivotable member, such as a wave-transfer shutoff valve. The pivotable member opens and closes an acoustic through-bore or other acoustic wave communication passages between otherwise differentiated portions of the intake manifold of the engine. The pivotable member enables the intake manifold to be adjusted to at least two discrete acoustic resonance geometry configurations.

In one case, the inlet manifold has two intake manifold portions. A block or flapper valve adjusts the acoustic passage between the portions to either an opened position or a closed position. When the valve is in the closed position, the two portions of the intake manifold are in acoustical wave communication. When the valve is in the opened position, the fluid materials in the two portions are separated from acoustical wave communication. The intake manifold is therefore adjustable to two different acoustic resonance geometry configurations. A degree of freedom is thereby provided to handle certain aspects of the fluid flow within the intake manifold.

Typically a position sensor is mounted to the valve to indicate to the controller an actual position of the valve. The actual position is used by control systems to diagnose a malfunction of the valve. For example, the actual position and a commanded position may be compared to detect the malfunction. However, an indication of the position of the valve may not be sufficient to indicate the true status of the valve. Additional methods should be employed to ensure the valve is functioning during vehicle operation according to design requirements.

SUMMARY OF THE INVENTION

Accordingly, a method of diagnosing a malfunction of a tuning valve of an intake manifold coupled to an internal combustion is provided. The method includes: commanding the tuning valve to at least one of a closed and an opened position; computing an average deviation of manifold absolute pressure; determining an average deviation threshold using fuzzy logic based on engine speed and airflow per cylinder; comparing the average deviation to the average deviation threshold; and diagnosing a malfunction of the tuning valve based on a comparison of the average deviation and the average deviation threshold.

In other features, a control system for determining a malfunction of an intake manifold tuning valve is provided. The system includes: a first input device that receives a manifold absolute pressure (MAP) signal indicating an absolute pressure of air in the intake manifold; a second input device that receives an engine speed signal indicating a rotational speed of the engine; and a control module that determines a malfunction of the intake manifold tuning valve by commanding the valve to at least one of a closed and an opened position, computing an average deviation in the MAP signal, determining a threshold based on the engine speed signal and an air per cylinder value, and comparing the average deviation in the MAP signal to the threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

Figure 1:
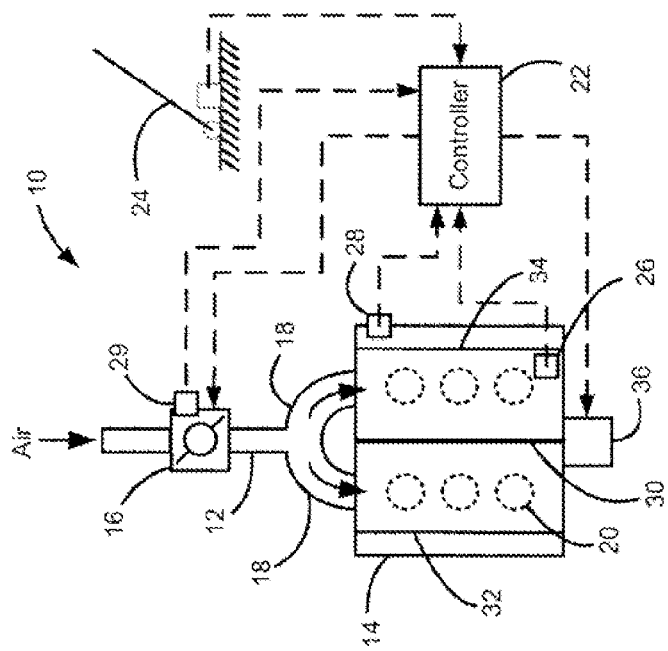
FIG. 1 is a functional block diagram of an engine system including an intake manifold tuning valve in a closed position.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
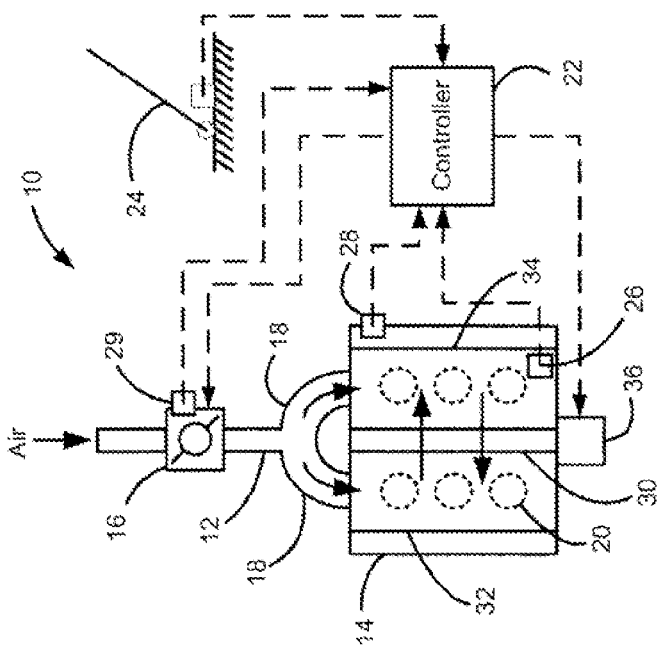
FIG. 2 is a functional block diagram of an engine system including an intake manifold tuning valve in an opened position.

Referring now to FIGS. 1 and 2, an internal combustion engine (ICE) 10 includes an inlet 12 and an intake manifold 14. Air is drawn into the inlet 12 through a throttle 16. The air flows into the intake manifold 14 through split zip tubes 18 of the inlet 12. Air and fuel are drawn into cylinders 20 of the engine 10 through respective inlet valves (not shown). The air/fuel mixture is combusted within the cylinders 20 to drive pistons (not shown). The pistons rotatably drive a crank (not shown) that delivers drive torque to a vehicle driveline (not shown).

A controller 22 communicates with the engine and various inputs and sensors as discussed herein. A commanded load input 24, such as an accelerator pedal, generates a load command signal that is communicated to the controller 22. The controller 22 regulates air flow into the intake manifold 14 based on the load command. An engine speed sensor 26 generates an engine speed signal that is communicated to the controller 22. A manifold absolute pressure (MAP) sensor 28 generates a MAP signal that is communicated to the controller 22. A throttle position sensor 29 generates a throttle position signal that is communicated to the controller 22.

The intake manifold 14 is a multi-plenum, active intake manifold (AIM). The intake manifold 14 can be of a discrete position type or of a continuously variable type. Discrete position type intake manifolds include multi-plenums divided by a tuning valve or short/long runner designs with shut-off valves. Continuously variable type intake manifolds include variable runner length designs. Although FIGS. 1 and 2 illustrate a discrete position type intake manifold, it is anticipated that the engine control of the present invention can also be implemented in a continuously variable type AIM. A resonance geometric configuration of the intake manifold 14 is adjusted based on operational categories of the engine 10, as discussed in further detail below. The resonance geometric configurations include a tuned configuration and a detuned configuration.

An intake manifold tuning valve 30 selectively divides the intake manifold into first and second plenums 32, 34. An actuator 36 selectively rotates the tuning valve 30 between an opened and a closed position. In the closed position, fluid communication is enabled across the entire intake manifold 14. In the opened position, the intake manifold 14 is split into the first and second plenums 32, 34 and fluid communication is inhibited between the first and second plenums 32, 34.

The intake manifold 14 is selectively operated in a tuned state or a detuned state. In various embodiments, when the tuning valve 30 is in the opened position, the intake manifold 14 is in the detuned state. When the tuning valve 30 is in the closed position, the intake manifold 14 is in the tuned state. In the tuned state, the volumetric efficiency ($V_{EFF}$) is higher than that of the detuned state for the same MAP. As a result, more air and fuel are added and retained in the cylinder 20 in the tuned state than in the detuned state. Therefore, intake manifold tuning is an effective means to improve the power density of the engine 10 at full load conditions. In various other embodiments, depending on the intake manifold design, the tuning valve may be implemented such that when the tuning valve 30 is in the closed position, the intake manifold 14 is in the detuned state. When the tuning valve 30 is in the opened position, the intake manifold 14 is in the tuned state.

In order to diagnose failures of a tuning valve, a control method utilizing fuzzy logic is implemented. The control method according to the present disclosure moves the tuning valve 30 to either a closed or an opened position while the vehicle is in a steady state cruise condition and verifies that the valve has actually moved to the commanded closed or opened position by evaluating engine operating parameters.

Figure 3:
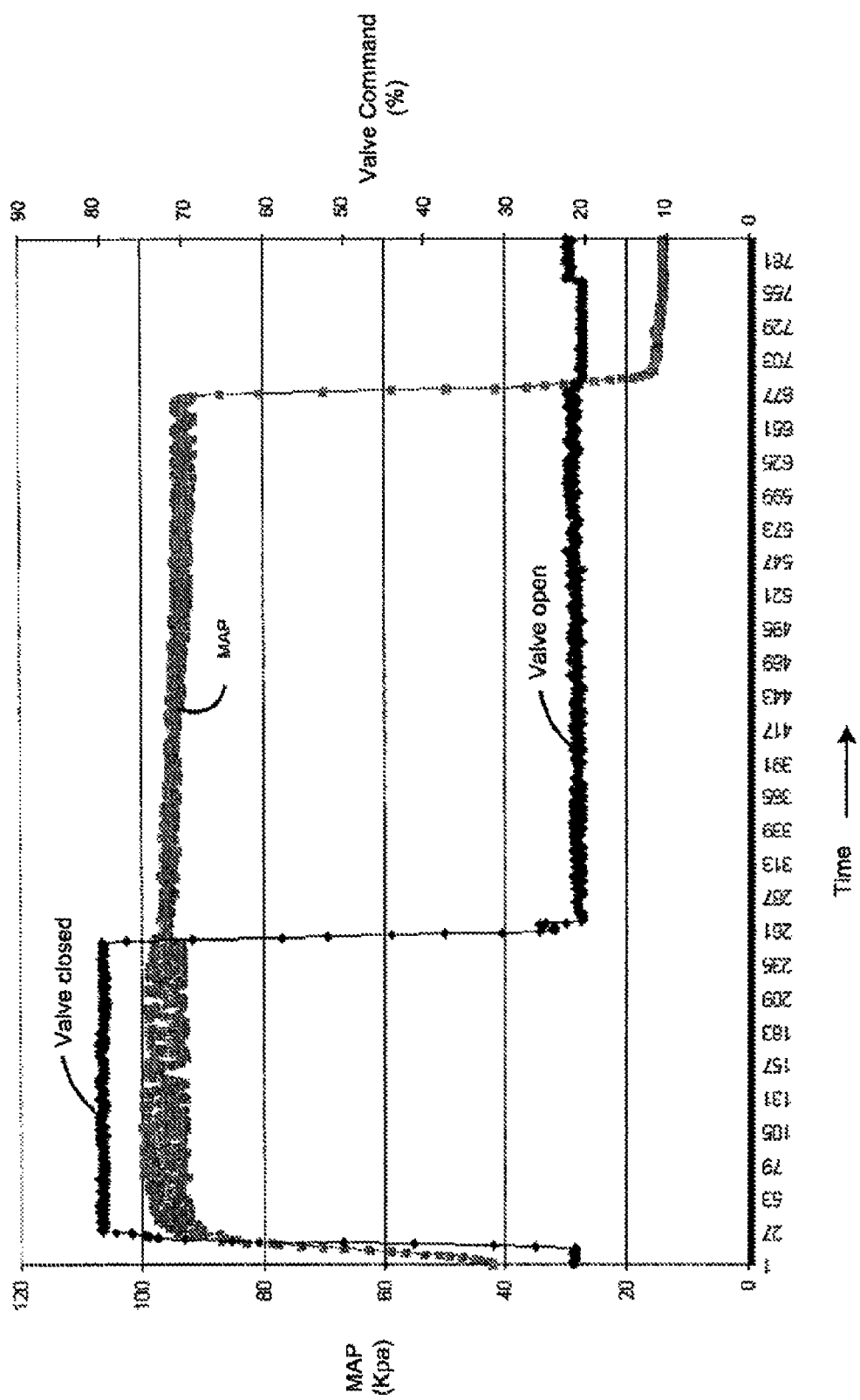
FIG. 3 is a graph illustrating manifold absolute pressure when the intake manifold tuning valve is commanded from the closed position to the opened position.

More particularly as shown in FIG. 3, the change in tuning valve position will produce a change in an average deviation of MAP. The MAP variation increases when the IMTV is closed. This is due to the airflow that is directed through the long paths of the intake manifold runners. The MAP variation amplitude will be the highest at the resonant frequency of the runners. Therefore, the present method monitors the average deviation in MAP when the tuning valve is controlled from an opened to closed position or a closed to opened position.

Fuzzy logic is provided to determine threshold values for comparison purposes. The MAP variation is related to engine speed and air per cylinder. In an exemplary embodiment, the thresholds are retrieved from a two dimensional table indexed by engine speed and a calculated air per cylinder value. If the average deviation is below the provided threshold when the tuning valve is commanded closed, a malfunction of the tuning valve is diagnosed. Conversely, if the average deviation is above the provided threshold when the tuning valve is commanded opened, a malfunction of the tuning valve is diagnosed.

Figure 4:
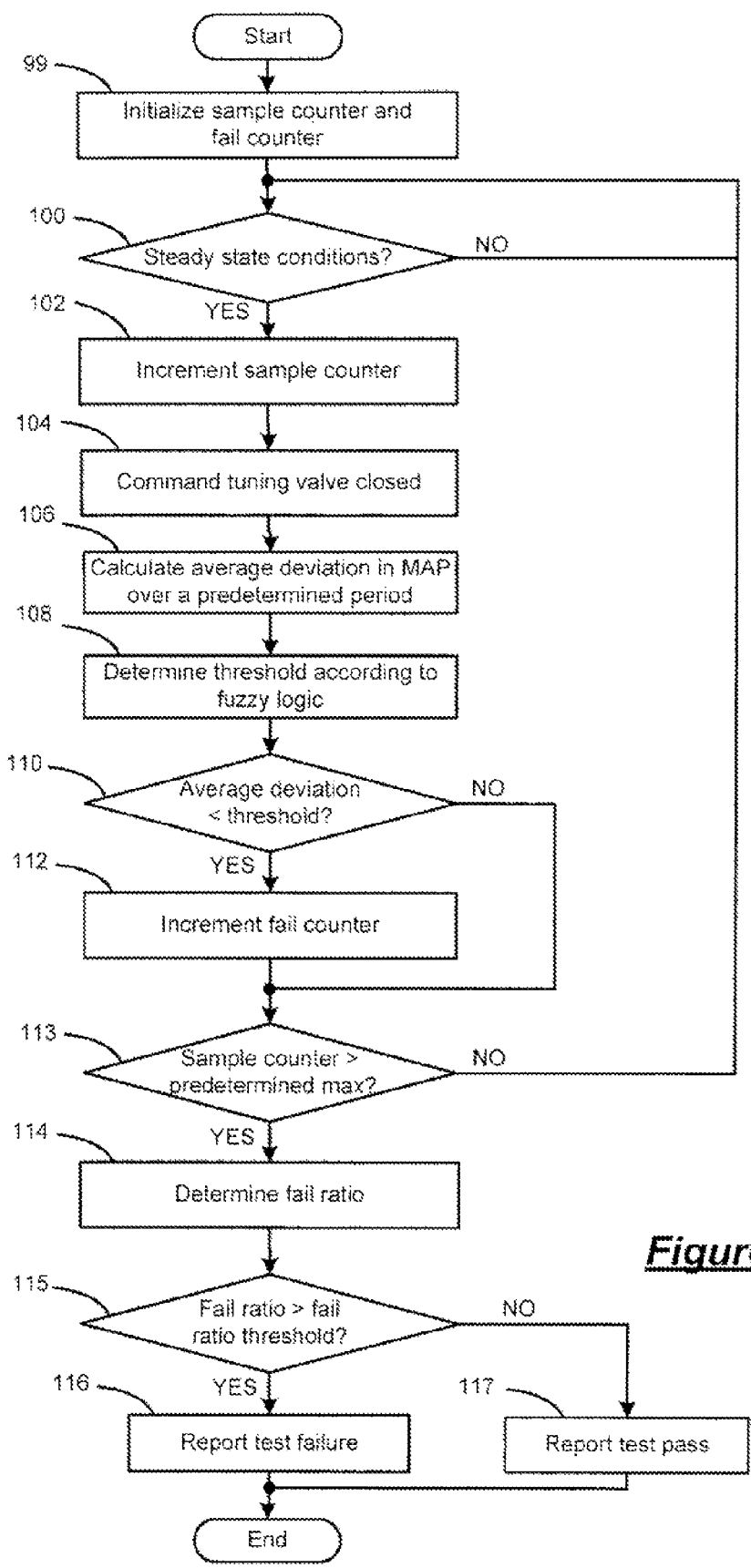
FIG. 4 is a flowchart illustrating an intake manifold tuning valve malfunction detection method.

Referring now to FIG. 4, a flowchart illustrates an exemplary control method of diagnosing a malfunction of the intake manifold tuning valve by commanding the tuning valve to a closed position. As can be appreciated the tuning valve diagnosis method of the present disclosure may be implemented in various forms. The method of FIG. 4 may be continually run throughout the key cycle of the vehicle. In an exemplary embodiment, the method of FIG. 4 is run every 0.0125 seconds.

In FIG. 4, a sample counter and a fail counter are initialized to zero at 99. Vehicle steady state conditions are monitored at 100. In various embodiments, steady state conditions may be determined from one or more of the following conditions: a throttle position within a predetermined range, a change in throttle position within a predetermined range, a manifold absolute pressure within a predetermined range, and an engine speed within a predetermined range. If steady state conditions exist at 100, control increments a sample counter at 102. Otherwise, control loops back and monitors steady state conditions at 100.

The tuning valve is commanded to a closed position at 104. An average deviation in MAP is calculated at 106 and a threshold is determined according to fuzzy logic at 108. If the average deviation in MAP is less than the threshold at 110, a fail counter is incremented at 112. If the sample counter is greater than a predetermined maximum at 113, a fail ratio (fail counter/sample counter) is computed at 114. Otherwise, control loops back and monitors steady state conditions at 100. If the fail ratio is greater than a fail ratio threshold at 115, an intake manifold tuning valve failure is reported at 116. Otherwise, an intake manifold tuning valve test pass is reported at 117

To report a failure, control may set a diagnostic code indicating the type of failure to TRUE. This code may be communicated to sub-systems on the vehicle via an onboard communication protocol and/or retrieved by technicians via scan tools connected to the vehicle. The code may also be sent via a wireless communication protocol to a remote processing location. Servicemen at the remote location are then able to provide diagnostic information to the drivers of the vehicle without being physically present. Once the failure is reported, engine control strategies may be adjusted to accommodate for the failure.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of diagnosing a malfunction of a tuning valve of an intake manifold coupled to an internal combustion engine, comprising:

commanding the tuning valve to at least one of a closed and an opened position;

computing an average deviation of manifold absolute pressure;

determining an average deviation threshold using fuzzy logic based on engine speed and airflow per cylinder;

comparing the average deviation to the average deviation threshold; and diagnosing a malfunction of the tuning valve based on a comparison of the average deviation and the average deviation threshold.

2. The method of claim 1 further comprising determining a steady state operating condition wherein the tuning valve is commanded to the at least one of the closed and the opened position when the steady state operating condition is determined.

3. The method of claim 1 further comprising setting a malfunction code when the malfunction is diagnosed.

4. The method of claim 3 further comprising reporting the malfunction code via at least one of a wireless communication signal and a vehicle onboard communication signal.

5. The method of claim 1 further comprising;
repeating the method of claim 1 M times, wherein M is an integer greater than one;
incrementing a sample counter each repetition;
incrementing a fail counter each time a malfunction is diagnosed within each repetition;
computing a fail ratio based on the fail counter and the sample counter; and
setting a malfunction code when the fail ratio exceeds a predetermined ratio threshold.

6. The method of claim 1 wherein the determining an average deviation threshold comprises interpolating a threshold value from a two dimensional table populated according to fuzzy logic and indexed by engine speed and air per cylinder.

7. The method of claim 1 wherein the diagnosing a malfunction of the tuning valve further comprises diagnosing a malfunction of the tuning valve if the tuning valve is commanded to the closed position and the average deviation is less than the average deviation threshold.

8. The method of claim 1 wherein the diagnosing a malfunction of the tuning valve further comprises diagnosing a malfunction of the tuning valve if the tuning valve is commanded to the opened position and the average deviation is greater than the average deviation threshold.

9. A control system for determining a malfunction of an intake manifold tuning valve coupled to an intake manifold of an engine, comprising:
a first input device that receives a manifold absolute pressure (MAP) signal indicating an absolute pressure of air in the intake manifold;
a second input device that receives an engine speed signal indicating a rotational speed of the engine; and
a control module that determines a malfunction of the intake manifold tuning valve by commanding the valve to at least one of a closed and an opened position, computing an average deviation in the MAP signal, determining a threshold based on the engine speed signal and an air per cylinder value, and comparing the average deviation in the MAP signal to the threshold.

10. The control system of claim 9 wherein the control module determines a malfunction of the intake manifold tuning valve when the tuning valve is commanded to the closed position and the average deviation in MAP is less than the threshold.

11. The control system of claim 9 wherein the control module determines a malfunction of the intake manifold tuning valve when the tuning valve is commanded to the opened position and the average deviation in MAP is greater than the threshold.

12. The control system of claim 9 wherein the control module sets a malfunction code when the malfunction is determined.

13. The control system of claim 9 wherein the control module sets a malfunction code if a malfunction occurs M number of times within a predetermined time period and wherein M is an integer greater than one.

14. The control system of claim 9 further comprising:
a fourth input device that receives a throttle position (TPS) signal indicating a position of a throttle coupled to the engine; and
wherein the control module determines a steady state condition based on the TPS signal and determines a malfunction of the intake manifold tuning valve if a steady state condition is determined, the tuning valve is commanded to the closed position, and the average deviation in MAP is less than the threshold.

15. The control system of claim 9 further comprising:
a fourth input device that receives a throttle position (TPS) signal indicating a position of a throttle coupled to the engine; and
wherein the control module determines a steady state condition based on the TPS signal and determines a malfunction of the intake manifold tuning valve if a steady state condition is determined.

16. The control system of claim 9 wherein the control module determines the threshold based on a two dimensional table populated according to fuzzy logic and indexed by engine speed and air per cylinder.

17. The control system of claim 9 wherein the control module determines a steady state condition based on the engine speed signal and determines a malfunction of the intake manifold tuning valve if a steady state condition is determined.

18. The control system of claim 9 wherein the control module determines a steady state condition based on the MAP signal and determines a malfunction of the intake manifold tuning valve if a steady state condition is determined.

* * * * *